United States Patent [19]
Ito et al.

[11] Patent Number: 5,458,391
[45] Date of Patent: Oct. 17, 1995

[54] FRONT AIR SPOILER APPARATUS FOR AUTOMOTIVE VEHICLE

[75] Inventors: Nobuo Ito; Yuichi Kitazawa, both of Yokohama, Japan

[73] Assignee: Ohi Seisakusho Co., Ltd., Yokohama, Japan

[21] Appl. No.: 116,749

[22] Filed: Sep. 7, 1993

[30] Foreign Application Priority Data

Sep. 8, 1992 [JP] Japan ................ 4-068796 U

[51] Int. Cl.⁶ .................................................. B62D 35/00
[52] U.S. Cl. .................................................. 296/180.1
[58] Field of Search ............ 296/180.1, 180.2, 296/180.3, 180.4, 180.5; 293/103, 118, 123; 180/903

[56] References Cited

U.S. PATENT DOCUMENTS 4,902,067  2/1990  Sakai et al. ............ 296/180.1

*Primary Examiner*—Andrew C. Pike
*Attorney, Agent, or Firm*—Foley & Lardner

[57] ABSTRACT

A front air spoiler apparatus for an automotive vehicle is provided with first and second air spoilers which are vertically moved by a driving unit. The first and second air spoilers are retracted at a front portion within a vehicle body in an overlapped condition, and set at an operating position so as to be vertically offset. Therefore, in a retracted condition the retracting space for the spoilers is kept small, and in an operating condition the effect front area of the air spoiler is largely increased.

8 Claims, 4 Drawing Sheets

5,458,391

FRONT AIR SPOILER APPARATUS FOR AUTOMOTIVE VEHICLE

BACKGROUND OF THE INVENTION

1. Field of the Invention

The present invention relates to an aerodynamic appendix, known as a front spoiler for intercepting the air which flows below a moving motor vehicle.

2. Description of the Prior Art

Various types of front spoiler units for an automotive vehicle have been proposed and in practical use. FIG. 5 shows a typical front spoiler unit B which is provided with a pair of spoiler elevation units 102, 102. Each of the spoiler elevation units 102, 102 is provided with an elevation shaft 103. A front air spoiler 104 is connected to the elevation shafts 103, 103, and is vertically movable between a retracted position, shown by a long and two short dashes line, and an operating position, shown by a continuous line. Accordingly, during low speed cruising or rough load cruising, it is possible that the air spoiler 104 is retracted inside of a vehicle body 101 by operating the both elevation units 102, so as to prevent the air spoiler 104 from being impacted with obstacles on road. On the other hand, during high speed cruising, the air spoiler 104 is lowered by the elevation units 102, in order to decrease the dynamic lift relative to the vehicle body 101 by decreasing the air flow amount passing through a portion between the vehicle body 101 and a road surface. Also, such an front air spoiler is required to enlarge a vertical length of the air spoiler 104 in order to further improve the aerodynamic performance. However, it is difficult to ensure a sufficient retracting space for such an enlarged air spoiler at the front portion of the vehicle body 101, since various parts, such as an engine or radiator, have been packed within the vehicle body 101. Accordingly, it is difficult to obtain a sufficient aerodynamic performance by such a conventional retractable front air spoiler.

SUMMARY OF THE INVENTION

It is an object of the present invention to provide a front air spoiler apparatus for an automotive vehicle which improves the above-mentioned drawbacks.

A front air spoiler apparatus according to the present invention is for an automotive vehicle. The apparatus comprises a first air spoiler which is movable between a first retracted position inside of a vehicle body of the automotive vehicle and a first operating position under the vehicle body. A second air spoiler is movable between a second retracted position inside of the vehicle body and a second operating position lower in height level than the first operating position. A driving unit is connected to the vehicle body and moves the first and second air spoilers between the retracted positions and the operating positions.

With this arrangement, the effective front area of the air spoiler relative to the aerodynamic performance is largely increased while the retracting space for the air spoilers is kept small.

DETAILED DESCRIPTION OF THE INVENTION

Figure 1:
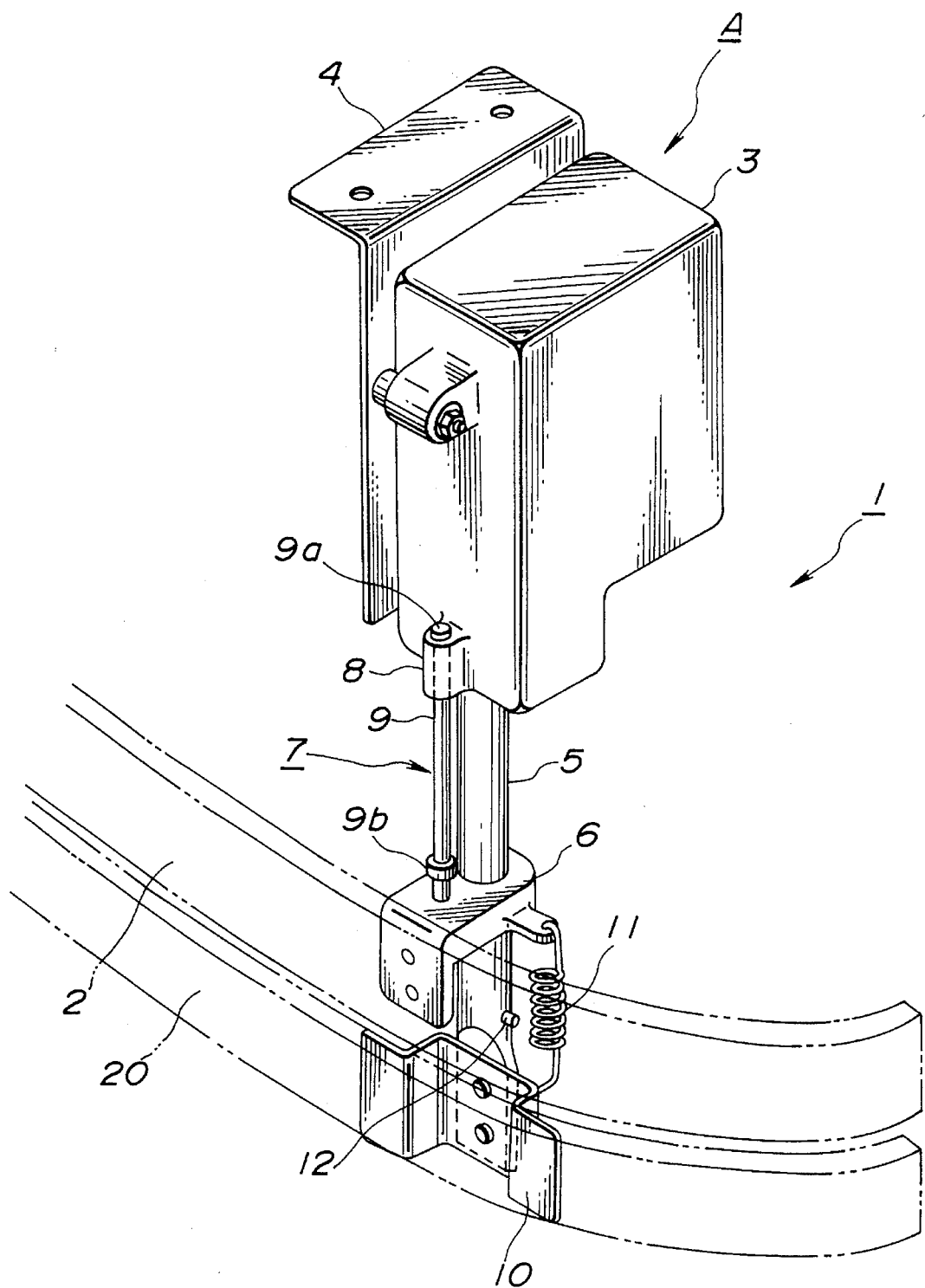
FIG. 1 is a perspective view of an essential part of an embodiment of a front air spoiler apparatus in operating condition according to the present invention.

Referring to FIG. 1 to 4, there is shown an embodiment of a front air spoiler apparatus A for an automotive vehicle according to the present invention.

The front air spoiler apparatus A comprises a driving unit 1, a first air spoiler 2 and a second air spoiler 20. A spoiler elevation device 3 is a part of the driving unit 1 and fixed to a front end of a chassis of a vehicle body 30 through a bracket 4. The spoiler elevation device 3 is provided with a motor 3; shown in FIG. 2, for vertically moving the first and second air spoilers 2 and 20. An elevation shaft 5 of a columnar shape downwardly extends from the spoiler elevation device 3. The first air spoiler 2 is fixed to a front portion of a bracket 6 which is slidably engaged with the elevation shaft 5.

A limiting device 7 for limiting a movable range of the first air spoiler 2 is disposed between the spoiler elevation device 3 and the bracket 6. The first air spoiler 2 is vertically movable within the range from a retracted position shown by FIG. 2 to an operating position shown by FIGS. 3 or 4.

The limiting device 7 is constituted by a guide cylinder 8, a guide shaft 9, and upper and lower stoppers 9a and 9b. The guide cylinder 8 is integral with the spoiler elevation device 3 and vertically formed. The guide shaft 9 is embedded at its lower end in the upper surface of the bracket 6 and extends upwardly. The guide shaft 9 is slidably engaged with the guide cylinder 8. The upper stopper 9a is connected at an upper end of the guide shaft 9 so as to stop a further lowering motion of the bracket 6. The lower stopper 9b is connected to a lower portion of the guide shaft 9 so as to stop a further raising motion of the bracket 6. That is, by the contact of the upper stopper 9a with the upper surface of the guide cylinder 8, the first air spoiler 2 is prevented from being further lowered to a position lower in height level than its operative position. Further, by the contact of the lower stopper 9b with the lower surface of the guide cylinder 8, it is prevented that the first air spoiler 2 is raised at a position higher in height level than its retracted position.

Figure 2:
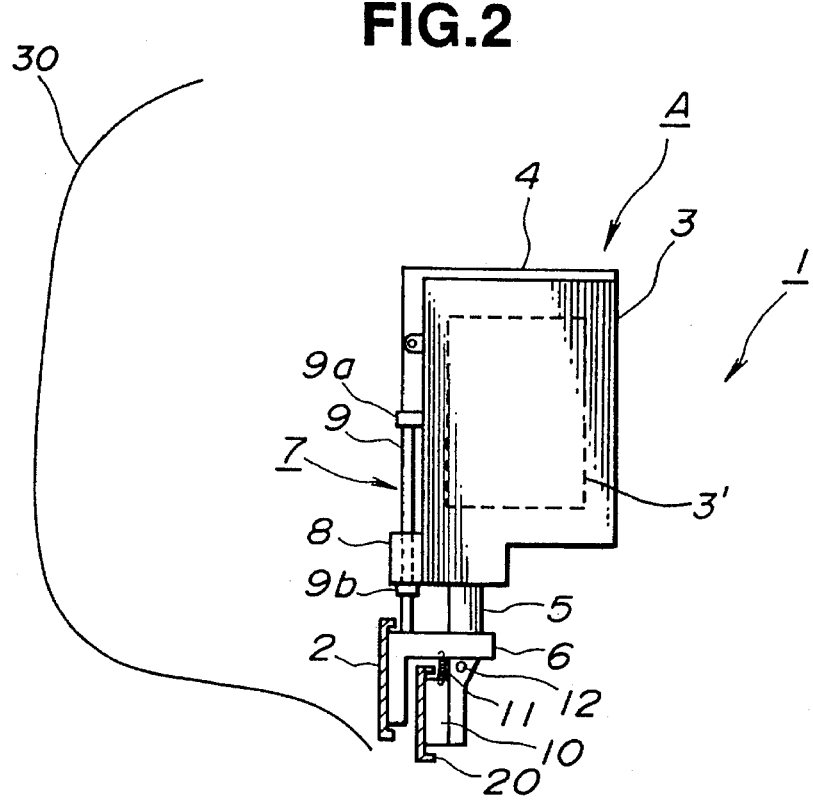
FIG. 2 is a cross-sectional side view of the embodiment in a retracted condition of FIG. 1.
Figure 3:
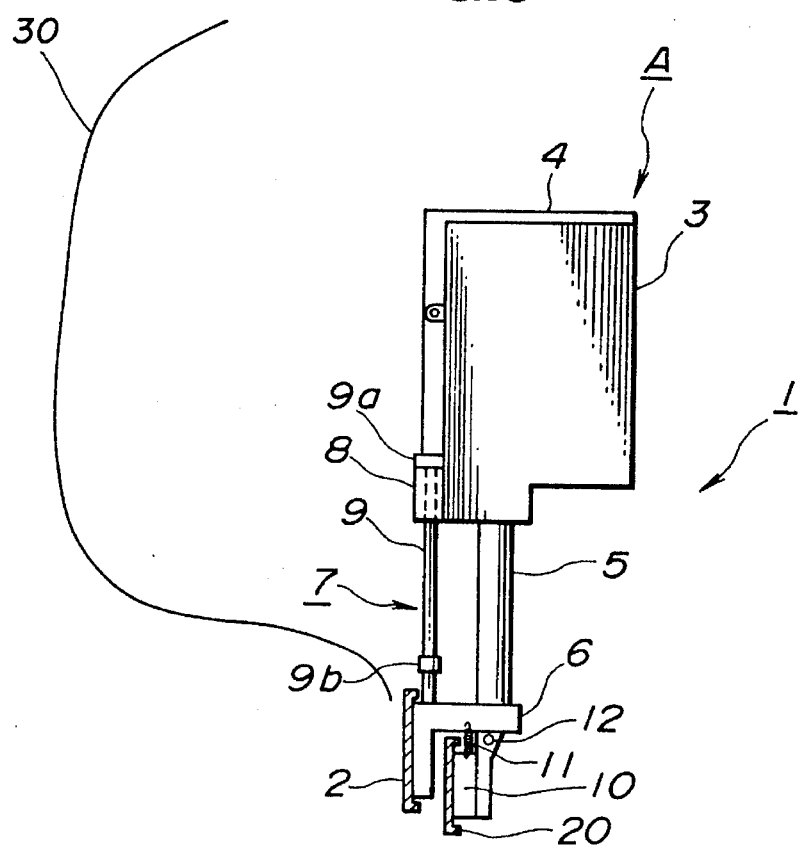
FIG. 3 is a cross-sectional view showing of the embodiment of the front air spoiler apparatus of FIG. 1 in a lowering condition.
Figure 4:
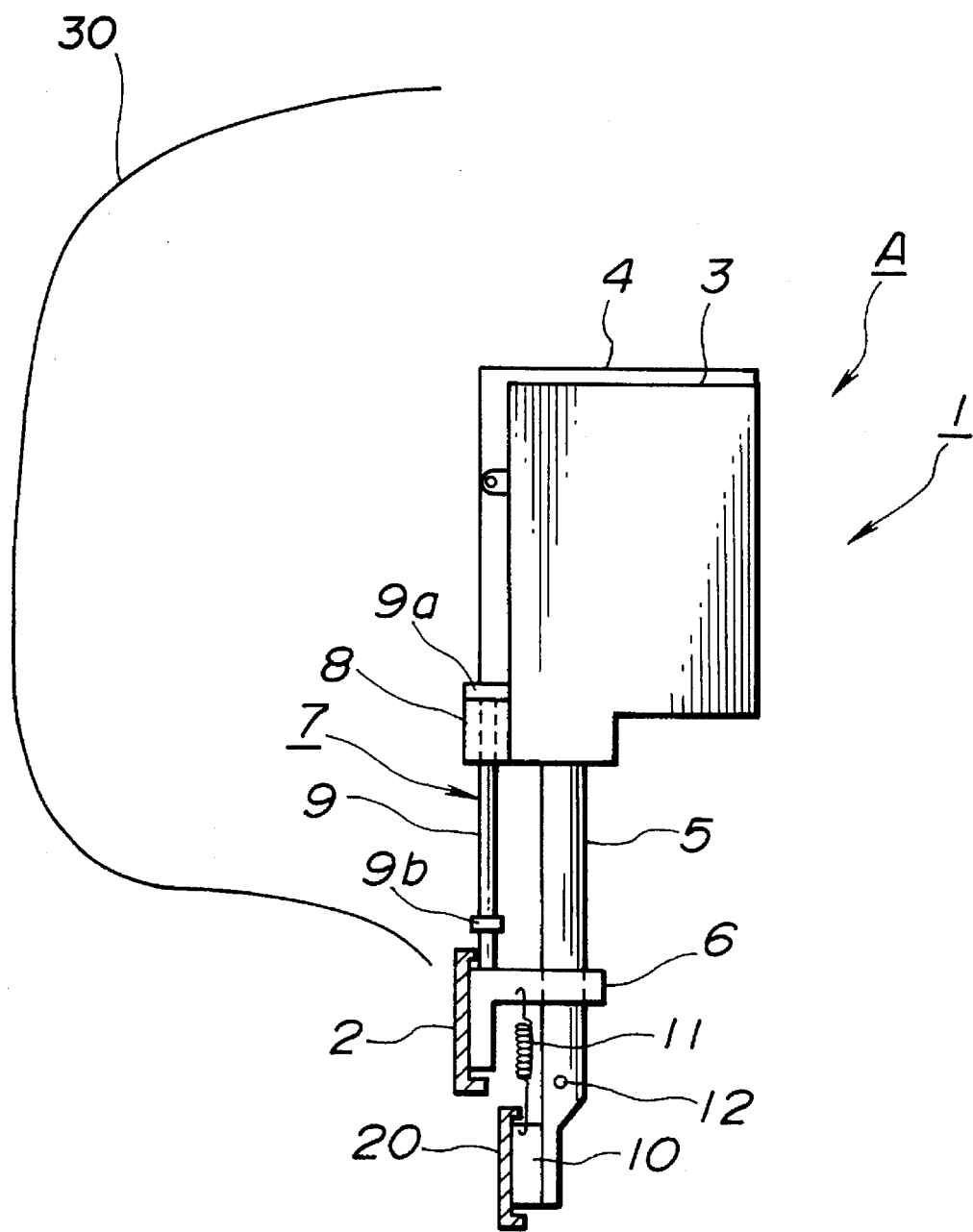
FIG. 4 is a cross-sectional side view of the front air spoiler apparatus of FIG. 1 in operating condition.
Figure 5:
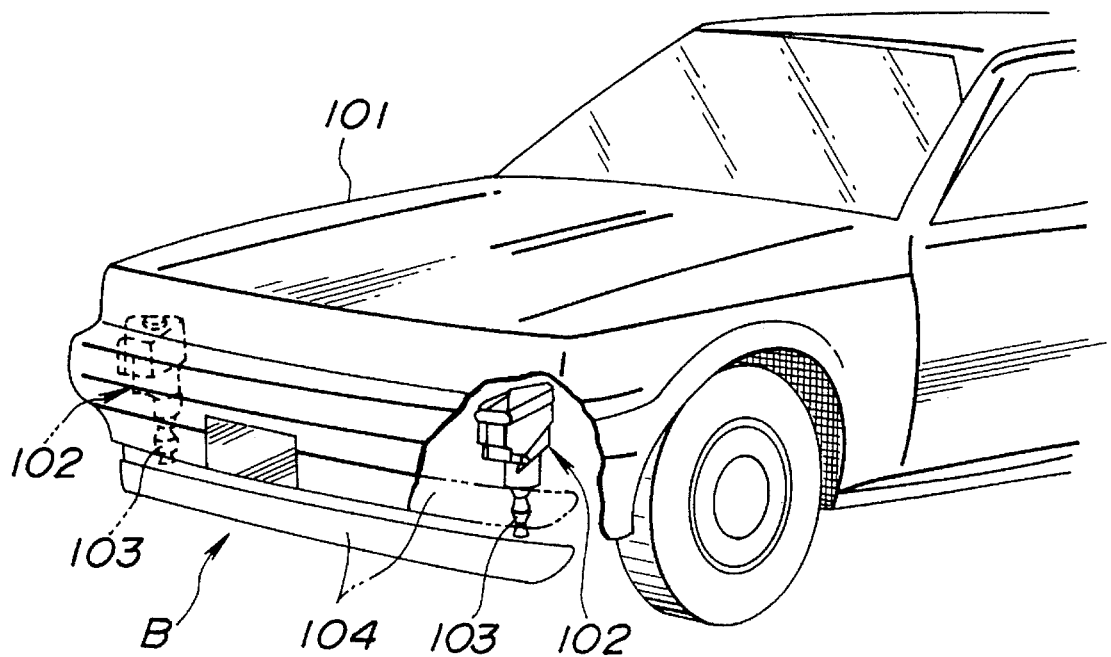
FIG. 5 is a perspective view, partially cutaway, of a front side of an automotive vehicle to which a conventional air spoiler apparatus is applied.

The second spoiler 20 is fixedly connected with the front surface of the lower end portion of the elevation shaft 5 through a bracket 10. The second air spoiler 20 is moved between the retracted position, where the second air spoiler 20 is retracted inside of the vehicle body 30 so as to overlap with the first air spoiler 2 as shown in FIG. 2, and the operating position lower in height level than the first air spoiler 2 as shown in FIG. 4, in accordance with the elevating movement of the elevation shaft 5.

An extension coil spring 11 connects the bracket 6 and the bracket 10 such that the first air spoiler 2 is pulled toward the second air spoiler 20. A fixing member 12 of a pin shape protrudes from the elevation shaft 5, and is located at a portion higher in height level than the installation position of the bracket 10 to the elevation shaft 5. When the elevation shaft 5 is raised, the first air spoiler 2 is raised from the operating position to the retracted position since the lower surface of the bracket 6 is raised by the fixing member 12 after the contact of the fixing member 12 with the bracket 6.

The driving unit 1 is constituted by the spoiler elevation device 3, the elevation shaft 5, the brackets 4 and 10, the limiting device 7, and the fixing member 12. With this driving unit 1, the first and second air spoilers 2 and 20 are retracted inside of the vehicle body 30 so as to be overlapped in the front and aft direction of the automotive vehicle.

The manner of operation of the thus arranged front air spoiler apparatus A according to the present invention will be discussed hereinafter.

FIG. 2 shows a condition in that the first and second air spoilers 2 and 20 are located at the respective retracted positions, where the first and second spoiler 2 and 20 are overlapped with each other in the front and aft direction of the automotive vehicle. When the elevation shaft 5 is lowered due to the operation of the spoiler elevation device 3 from the condition shown in FIG. 2, the first and second air spoilers 2 and 20 are integrally lowered to a position shown in FIG. 3 where the upper stopper 9a is contacted with the upper end of the guide cylinder 8. At this point, the lowering motion of the first air spoiler 2 is stopped, and the first air spoiler 2 is positioned at an operating position. Further, the elevation shaft 5 is continuously lowered, and the second air spoiler 20 is lowered while extending the extension spring 11. When the second air spoiler 20 reaches the operating position shown in FIG. 4, the lowering operation of the spoiler elevation device 3 is stopped. When the front air spoiler apparatus A is in a condition shown by FIG. 4, the first and second air spoilers 2 and 20 are positioned at the respective operating positions where the first and second air spoilers 2 and 20 are near in the front and aft direction and vertically offset with each other.

Under such a condition, an effective area relative to the aerodynamic performance becomes the sum of the front surface areas of the first and second air spoilers 2 and 20. Accordingly, the aerodynamic performance of this front air spoiler apparatus A is remarkably increased.

In order to retract the first and second air spoilers 2 and 20 at the respective retracted positions, the elevation shaft 5 is elevated by the operation of the spoiler elevation device 3. By this operation, the second air spoiler 20 is directly raised at the position shown in FIG. 3 until the fixing member 12 is in contact with the bracket 6. After this contact, the first air spoiler 2 is also raised together with the second air spoiler 20. Then, when the first and second air spoilers 2 and 20 reach the respective retracted positions shown in FIG. 2, the operation of the spoiler elevation device 3 is stopped, and the first and second air spoilers 2 and 20 are retracted inside of the vehicle body 30 in an overlapped condition.

With the thus arranged front air spoiler apparatus A, the effective area relative to the aerodynamic performance is largely increased. Furthermore, the retracting space for the air spoilers is kept small.

Although this embodiment has been shown and described such that the first and second air spoilers 2 and 20 are driven by a pair of driving units 1, it will be understood that the first and second air spoilers 2 and 20 may be driven by one driving unit disposed at a center of the vehicle body 30 or respective driving units independently. Furthermore, it will be noted that the number of the air spoilers may be three or more.

What is claimed is:

1. A front air spoiler apparatus for an automotive vehicle, said apparatus comprising:

a first air spoiler movable between a first retracted position inside of a vehicle body of the automotive vehicle and a first operating position under the vehicle body;

a second air spoiler movable between a second retracted position inside of the vehicle body and a second operating position lower in height level than the first operating position; and a driving unit connected to the vehicle body, said driving unit moving said first air spoiler between the first retracted position and the first operating position, said driving unit also moving said second air spoiler between the second retracted position and the second operating position.

2. A front air spoiler apparatus as claimed in claim 1, wherein said first air spoiler is located in front of said second air spoiler so as to overlap with each other when in the first retracted position.

3. A front air spoiler apparatus as claimed in claim 2, wherein said driving unit comprises:

a spoiler elevation unit including a motor;

an elevation shaft fixed at a lower end thereof with said second air spoiler, said elevation shaft being vertically movably connected to said spoiler elevation unit;

a bracket vertically slidably engaged with said elevation shaft and fixedly connected with said first air spoiler;

a limiting device disposed between said bracket and the vehicle body, said limiting device limiting a movable range of said first air spoiler so as to be movable between the first retracted position and the first operating position; and a fixing member protruding from said elevation shaft, said fixing member being fixed at a lower end of said bracket when said elevation shaft is raised, such that said first air spoiler is raised from the first operating position to the first retracted position.

4. A front air spoiler apparatus as claimed in claim 1, wherein said driving unit comprises:

a spoiler elevation unit including a motor;

an elevation shaft fixed at a lower end thereof with said second air spoiler, said elevation shaft being vertically movably connected to said spoiler elevation unit;

a bracket vertically slidably engaged with said elevation shaft and fixedly connected with said first air spoiler;

a limiting device disposed between said bracket and the vehicle body, said limiting device limiting a movable range of said first air spoiler so as to be movable between the first retracted position and the first operating position; and a fixing member protruding from said elevation shaft, said fixing member being in contact with a lower end of said bracket when said elevation shaft is raised, such that said first air spoiler is raised from the first operating position to the first retracted position.

5. A front air spoiler apparatus as claimed in claim 4, wherein said limiting device comprises a guide cylinder which is integrally connected with said driving unit, a guide shaft which is slidably engaged with said guide cylinder, and upper and lower stoppers which are connected to said guide shaft so as to limit vertical movement of said first air spoiler.

6. A front air spoiler apparatus as claimed in claim 4, wherein a spring connects said first and second air spoilers.

7. A front air spoiler apparatus for an automotive vehicle, said apparatus comprising:

a driving unit connected to a vehicle body of the automotive vehicle, said driving unit having an elevation shaft which moves vertically;

a first air spoiler vertically slidably connected to the elevation shaft;

a second air spoiler fixedly connected with a lower end of the elevation shaft;

a spring resiliently connecting said first and second air spoilers; and a stopper limiting a vertical movement of said first air spoiler within a predetermined range.

8. A front air spoiler apparatus as claimed in claim 7, wherein the predetermined range of the vertical movement of said first air spoiler is smaller than a vertically movable range of said second air spoiler.

* * * * *